US008428307B2

(12) United States Patent
Bradai et al.

(10) Patent No.: US 8,428,307 B2
(45) Date of Patent: Apr. 23, 2013

(54) PROCESS FOR THE AUTOMATIC DETERMINATION OF SPEED LIMITATIONS ON A ROAD AND AN ASSOCIATED SYSTEM

(75) Inventors: Benazouz Bradai, Bobigny (FR); Anne Herbin-Sahler, Paris (FR); Jean-Philippe Lauffenburger, Rixheim (FR); Michel Basset, Heimsbrunn (FR)

(73) Assignee: Valeo Vision, Bobigny (FR)

( * ) Notice: Subject to any disclaimer, the term of this patent is extended or adjusted under 35 U.S.C. 154(b) by 1221 days.

(21) Appl. No.: 12/175,565

(22) Filed: Jul. 18, 2008

(65) Prior Publication Data

US 2009/0041304 A1 Feb. 12, 2009

(30) Foreign Application Priority Data

Jul. 20, 2007 (FR) .................................... 07 05299

(51) Int. Cl.
*G06K 9/00* (2006.01)
*G06G 7/76* (2006.01)

(52) U.S. Cl.
USPC .......................................... 382/104; 701/119

(58) Field of Classification Search ........................ None
See application file for complete search history.

(56) References Cited

U.S. PATENT DOCUMENTS

| | | | | |
|---|---|---|---|---|
| 6,265,989 | B1 * | 7/2001 | Taylor | 340/901 |
| 6,515,596 | B2 * | 2/2003 | Awada | 340/905 |
| 7,058,206 | B1 * | 6/2006 | Janssen et al. | 382/104 |
| 7,711,468 | B1 * | 5/2010 | Levy | 701/70 |
| 7,739,036 | B2 * | 6/2010 | Grimm et al. | 701/420 |
| 2006/0061461 | A1 | 3/2006 | Li | |
| 2007/0067086 | A1 | 3/2007 | Rothschild | |
| 2007/0109807 | A1 * | 5/2007 | Lynam et al. | 362/545 |
| 2008/0004789 | A1 * | 1/2008 | Horvitz et al. | 701/117 |
| 2009/0041304 | A1 * | 2/2009 | Bradai et al. | 382/104 |
| 2009/0074249 | A1 * | 3/2009 | Moed et al. | 382/104 |
| 2009/0079555 | A1 * | 3/2009 | Aguirre De Carcer et al. | 340/441 |
| 2010/0188288 | A1 * | 7/2010 | Bahlmann et al. | 342/357.23 |

FOREIGN PATENT DOCUMENTS

| | | | |
|---|---|---|---|
| DE | 19938266 | A1 | 2/2001 |
| JP | 0785400 | * | 3/1995 |

OTHER PUBLICATIONS

Bahlmann et al., "Multi-modal speed limit assistants: Combining camera and GPS maps", Intelligent Vehicles Symposium, 2008 IEEE, Date of Conference: Jun. 4-6, 2008, pp. 132-137.*

English translation of JP07085400, Originally Published Mar. 31, 2012, pp. 1-11.*

* cited by examiner

*Primary Examiner* — Bhavesh Mehta
*Assistant Examiner* — Tahmina Ansari
(74) *Attorney, Agent, or Firm* — Jacox, Meckstroth & Jenkins

(57) ABSTRACT

An automatic process is provided for automatically determining a current speed limitation on a road being used by a motor vehicle, in which by means of a first system, making use in particular of a GPS aerial and cartographical details, a first set of information is established, in which at least one likely speed limitation is associated with a confidence index; by means of a second system, involving the use of a camera and image processing applications capable of identifying roadside speed limitation panels, a second set of information is established comprising at least one probable speed limitation, wherein the basis of the first and second sets of information, the current speed limitation is determined along the road in question.

20 Claims, 2 Drawing Sheets

PROCESS FOR THE AUTOMATIC DETERMINATION OF SPEED LIMITATIONS ON A ROAD AND AN ASSOCIATED SYSTEM

CROSS-REFERENCE TO RELATED APPLICATIONS

This application claims priority to French Application No. 0705299 filed Jul. 20, 2007, which application is incorporated herein by reference and made a part hereof.

BACKGROUND OF THE INVENTION

1. Field of the Invention

The object of the present invention relates to a process for the determination of speed limits on a road used by a motor vehicle and a process for the operation of this system. The aim of the present invention is essentially to propose a solution whereby, under all conditions, information relating to a speed limitation to be applied to a road in use, or on the point of being used, by a motor vehicle. The information collected in this manner can then be used in the different applications with which the vehicle in question is equipped. Notably, but not in a limiting manner, information relating to a speed limitation can be used within a system aimed at helping to indicate explicitly the maximum authorized speed limit to the driver if the latter has exceeded this limit.

2. Description of the Related Art

In a general manner, the purpose of the invention is to assist driving by proposing a series of systems aimed at assisting the driver and essentially intended to improve road safety conditions. In this way, for example, the following developments have been made:

systems described as night vision systems to help the driver to detect in advance objects, which would otherwise be difficult to detect under night time driving conditions;

systems designed for the advance anticipation of bends, with the aim of warning the driver at an early stage of an approaching bend.

Within the framework of systems intended to aid driving, there have also been attempts to propose systems for warning drivers of speed limitations. A system of this nature must enable a speed limit on a road that is in use, or a road that is to be in use, to be automatically detected by a vehicle. In fact, action relating to excessive speeds is necessary in order to reduce the number of accidents and the gravity of their consequences. Many drivers do not respect the speed regulations: 40% of them do not respect the motorway speed limits, 60% do not respect speed limits on national and departmental and 25% of drivers exceed urban speed limits by more than 10 km/h.

To date, there have been two sorts of proposals for the automatic determination of a speed limit applicable to a particular road.

The first type of solution lies in the manner in which information coming from a navigation system is used. Such navigation systems are increasingly installed in vehicles in order to guide the driver from one point (corresponding to the actual position of his vehicle) to a destination point (chosen by the driver). They combine map information with information relating to the position of the vehicle provided by a GPS system and often enable to know in advance the characteristics of the road. Furthermore, information connected with the characteristics of the road is linked to the speed limitation associated with this road. Other information, typically indications of road junctions or motorway exits, for example, are also available using this system. Moreover, if the driver chooses a route from point A to point B, the route that the vehicle is likely to take is known in advance and the knowledge of the speed limitations that are likely to be in force in this route can, on the whole, be anticipated up to a distance of ten kilometers beforehand.

Nevertheless, the system comprises a number of inherent weaknesses that limit its effectiveness:

current cartography is still very imprecise. It frequently happens that information is completely lacking at a given place. In fact, there may be entire areas throughout the world that are not completely covered by the cartographical data bases;

it can also happen that the information supplied by the navigation system is incorrect. For example, if a driver intends heading for a place B that he has stored in his navigation system and if, finally, during his journey he is obliged to head for a place C without following the instructions given by his navigation system, the instructions given by this system are confusing or even contradictory in relation to the characteristics of the route that the vehicle is actually following;

variations in the configuration of the road as a result of unexpected events, for example, road works, can have the effect of modifying the speed limit over the part of the road in question; these modifications are not known to the navigation system.

it is also possible for GPS cover to be lost completely for a time, for example, when driving through a long tunnel.

There is a second type of solution for automatically determining a speed limit that is in force based on using information supplied by an image processing system. This type of system makes use of at least one camera and image processing software applications. The camera captures images along the road and the image processing system indicates any speed limit panels and enables the symbols on these panels to be read. This system then displays the speed limit panel that has been detected with a certain degree of accuracy. One such known system is the “Speed Limit Support” system, which helps drivers by informing them of the speed limits on the road on which they are driving, so as to ensure that these limits are not exceeded. This system is intended to complement the manual speed limiter, which is already commercially available in certain vehicles.

However, such systems are likely to be unreliable in certain traffic situations, especially at motorway exit points, during the night or if a vehicle is travelling at high speed and more particularly, where different speed limits apply for different types of vehicles. In these cases, the correct functioning of the algorithms for the recognition of the different characters on the speed restriction panels cannot be guaranteed. Moreover, at junctions, bifurcations or where there are several traffic lanes, systems of this type are unable to detect the relevant speed restriction panels, as there can be different panels in force for different traffic lanes, and they are unable to distinguish effectively between these panels and road in question. In addition, it has to be observed that the range of such systems is usually no more than a few dozen meters, with the result that they are unable to detect the panels if they are obscured by obstacles in front of the vehicle or by a succession of bends.

Consequently, none of the existing systems are entirely satisfactory for the automatic detection of current speed limits on a busy road.

SUMMARY OF THE INVENTION

The object of the present invention proposes a solution to the problems outlined above. In a general manner, in order to determine a given speed limit on a particular road, the invention proposes the combination of the two systems mentioned above, namely the navigation system and the system combining a camera and image processing applications, by proposing to do the fusion these two sources of information. In this way, a much more reliable system for the determination of current speed limits is obtained than the systems of the prior art. In particular, this eliminates the risks of confusion attributable to incorrect information or an incorrect interpretation of this information. In this way, one particular embodiment of the present invention proposes the advantage of having a limped home mode in the event that one of the two systems should fail, with the system continuing to operate on the basis of the other system. This possibility of a limped home mode is not available in the current state of the art.

The present invention therefore enables information to be obtained on the speed limit of a road that is being used, or about to be used, by a motor vehicle, with this information resulting from the combined use of information obtained from these two separate systems. Advantageously, a degree of reliability is attributed at least to the navigations system as a result of the fusion of the information from the two systems. Advantageously, information relating to speed limits provided by at least one of the systems can be extrapolated in order to foresee other speed limits that might be in force along the road in question. A weighting coefficient is then attributed to each of these other speed limits, known as the mass of belief, coming into play with the fusion of all information available relating to the speed limit likely to be in force, with this fusion of information providing the final determination of the searched speed limit.

The invention therefore essentially concerns a process for the automatic determination of a speed limit in force on a road that is being driven, or that is about to be driven by a motor vehicle comprising following steps:

establishing, by means of a first system, known as the navigation system, this navigation system involving notably a receiver of data from a geographical positioning system and cartographical data, of a likely speed limit associated with a first confidence index;

constituting a first set of information comprising at least the likely speed limit and the first confidence index;

establishing, by means of a second system, known as the image processing system, involving notably the use of a camera and image processing applications capable of identifying and interpreting speed limit panels arranged in the vicinity of the road, a probable speed limit;

constituting a second set of information comprising at least the probable speed limit;

determining, on the basis of the first set of information and of the second set of information, the current speed limit on the road in question.

Apart from the principal characteristics referred to in the preceding paragraph, the process in accordance with the present invention may have one or more additional characteristics including the following:

the probable speed limit is associated with at least a second confidence index, with the step of determining the current speed limit being effected by taking into consideration both the first and the second indexes of confidence;

the first set of information is completed by a set of additional probable speed limitations;

the likely speed limitation and each additional likely speed limitation are associated with a weighting coefficient, known as the mass of belief, determined on the basis of at least one of the following parameters:

the first confidence index, and an index of consistency between the likely speed limitation and the characteristics of the road provided by the navigation system;

the additional likely speed limitations are the two statutory speed limitations immediately preceding and following the probable speed limitation;

the second set of information is completed by a set of additional probable speed limitations;

the probable speed limitation and each additional probable speed limitation are associated with a weighting coefficient, the mass of belief, determined on the basis of at least one of the following parameters:

the second confidence index;

an index of possible confusion between the figures constituting the established probable speed limitation and other figures;

the additional probable speed limitations are the statutory speed limitations for which an index for the possible confusion between the figures constituting the established probable speed limitation and the figures for the additional probable speed limitation is greater that a threshold value, known as the critical threshold value;

the determined current speed limitation value is associated with a third confidence index, calculated at least on the basis of the first confidence index and the second confidence index;

this process includes an additional step consisting in using the determined current speed limitation if the third confidence index is greater than a third threshold value;

the first confidence index is calculated on the basis of one or more parameters from a first set of parameters made up of the following parameters:

accuracy of the geographical positioning system, level of information on the road, functional class of the road, type of road, surroundings of the vehicle, selection of a driving mode by the driver and level of conformity between a pre-determined itinerary and the information provided by sensors fitted to the vehicle, accuracy of the cartographical digitization, date when the cartography was last updated, and state of the road traffic (vehicle density on the road being driven and the fluidity). This information can be obtained, for example, using real-time traffic information.

the first confidence index is calculated by carrying out a weighted average of values assigned to the following parameters, with these parameters being associated with weighting coefficients obtained from a learning phase:

accuracy of the geographical positioning system, level of information on the road, functional class of the road, type of road, surroundings of the vehicle, selection of a driving mode by the driver and the level of conformity between a pre-determined itinerary and the information provided by sensors fitted to the vehicle the vehicle, the second confidence index is calculated on the basis of one or more parameters, from a second set of parameters relating to one or more images obtained by the camera, including the following:

index of the consistency of the identification of the speed limit panels from one image to the next one, measurement of the texture of the image in question, shadow factor of the image in question, vertical gradient of the reduction of the light, and symmetry index of the image in question;

the second confidence index is calculated by carrying out a weighted average of the values assigned to all the parameters of the second set of parameters, these parameters being associated with weighting coefficients resulting from a learning phase;

the process comprises additional steps consisting in:

comparing the first confidence index with a first threshold value and the second confidence index with a second threshold value, when determining the current speed limitation, considering only the set or sets of information, from the first and the second sets of information, the confidence index of which is greater than the threshold value to which it is compared;

the step for the determination of the current speed limitation involves the use of a Dempster-Shafer equation.

The present invention also relates to a system for the automatic determination of a current speed limitation on a road being used, or on the point of being used, by a motor vehicle, using the process according to the present invention with its principal characteristics and possibly one or more of the additional characteristics referred to, characterized in that it comprises:

a first system, known as the navigation system, involving notably the use of a geographical positioning system and cartography data in order to establish a likely speed limitation associated with a first confidence index and in order to constitute a first set of information comprising at least the likely speed limitation and the initial confidence index;

a second system, known as the image processing system, involving notably a camera and image processing applications, capable of identifying and interpreting speed limitation panels arranged in the vicinity of the road in order to establish a probable speed limitation and to constitute a second set of information comprising at least the probable speed limitation;

means for processing information to determine, from the first and the second sets of information, the current speed limitation in force on the road in question.

In addition to the principal characteristics mentioned in the previous paragraph, the system in accordance with the present invention have the following additional feature:

the system comprises the means for restitution of the determined current speed limitation.

Finally, the present invention relates to any motor vehicle that is fitted with a system for automatically determining the current speed limitation on a road being used, or about to be used, by the motor vehicle in question, with its principal characteristics and any other additional characteristics.

The geographical positioning system can be, for example, a system based on a satellite network enabling the receivers with which they communicate, such as for example GPS, to be geodesically positioned. In this case, the data is received by a GPS receiver or GPS aerial.

These and other objects and advantages of the invention will be apparent from the following description, the accompanying drawings and the appended claims.

The invention and its different applications will be better understood by reading the following description and studying the accompanying diagrams.

BRIEF DESCRIPTION OF THE ACCOMPANYING DRAWINGS

The diagrams are shown purely for illustrative purposes and are not intended to limit the invention in any way. The figures show as follows.

DETAILED DESCRIPTION OF THE PREFERRED EMBODIMENTS

Unless otherwise indicated, the different elements appearing on the figures have retained the same reference numbers.

Figure 1:
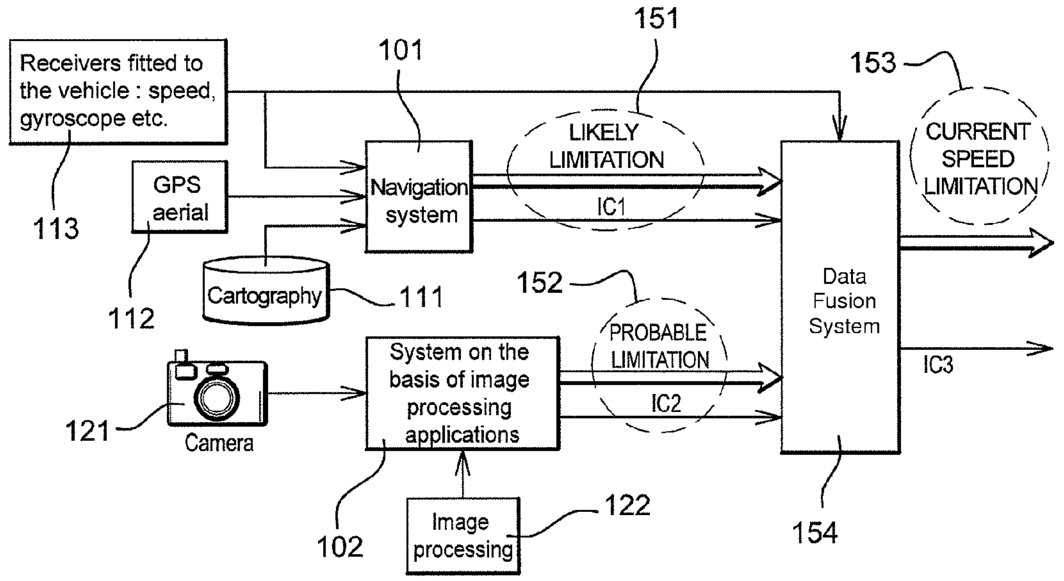
FIG. 1 shows an outline sketch of the invention, illustrating the combination of the systems fitted to the vehicle.

FIG. 1 shows in a schematic form the different elements of a typical embodiment of the process in accordance with the invention fitted to a motor vehicle, enabling a speed limitation (commonly known as a speed limit) 153 to be obtained on a road being used, or about to be used, by a motor vehicle. The vehicle in question contains a first system 101, known as the navigation system, enabling in particular an authorized speed to be estimated at a given point and making use, in particular of cartography details 111 and a GPS aerial 112 placed on the vehicle and able to receive precise location details. In the embodiment shown, the first system 101 also has a number of receivers 113 fitted to the vehicle in question, of the speed recorder, gyroscope etc. These different receivers 113 are able to provide different information, allowing in particular the consistency between the route effectively followed by the vehicle and the route prescribed by the navigation system 101 to be verified.

The navigation system 101 enables a first set of information 151 to be obtained on the searched speed limitation at a given point, especially in the proximity of the momentary position of the vehicle. The first set of information 151 comprises at least a likely speed limitation that corresponds to a speed limitation established by the navigation system 101, associated with a first confidence index IC1.

The first confidence index IC1 can be calculated for example from the following equation:

$$IC1=(\alpha_1\times C_1+\alpha_2\times C_2+\alpha_3\times C_3+\alpha_4\times C_4+\alpha_5\times C_5+\alpha_6\times C_6)/(\alpha_1+\alpha_2+\alpha_3+\alpha_4+\alpha_5+\alpha_6),$$

in which:

$C_1$: the index of confidence for the GPS positioning;

$C_2$: the level of information on the road (given by the ADAS classification);

$C_3$: the functional class of the road: FC1 or FC2;

$C_4$: the type of road;

$C_5$: the environment (urban, motorway exit, intersection etc.);

$C_6$: the driving mode selected or not by the driver;

and in which $\alpha_1$, $\alpha_2$, $\alpha_3$, $\alpha_4$, $\alpha_5$ and $\alpha_6$ are weighting coefficients, known as intermediate confidence indexes, assigned to the different criteria in relation to the confidence of their information.

In this way, different weights can be applied to these criteria. For example, the type of road can be one criterion that discriminates between speed limitations due to the fact that essentially the speed limitations are already defined by the road type. Consequently, this criterion can have a greater weight than for the driving mode, with a coefficient of 3 for the type of road and a coefficient of 1 for the driving mode.

Table 1 below gives an example of the assignment of values to the different criteria arising. The letters “SL” shown in the table indicate the speed limitation in question.

TABLE 1

| CRITERIA | SPEED LIMITATIONS | | | | | | | | | | | | | | |
|---|---|---|---|---|---|---|---|---|---|---|---|---|---|---|---|
| | SL1 5 | SL2 10 | SL3 20 | SL4 30 | SL5 45 | SL6 50 | SL7 60 | SL8 70 | SL9 80 | SL10 90 | SL11 100 | SL12 110 | SL13 120 | SL14 130 | SL15 999 |
| C1: Validated GPS MLCP (>=0.6) | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| C1: GPS LMCP between (0.3 <= MLCP < 0.6) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| C1: Not Validated GPS MLCP (<0.3) | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| C2: Validated ADAS attribute | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| C2: Non-validated ADAS attribute | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| C3: Functional road class (FC1, FC2) - Validated | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| C3: Functional road class (FC1, FC2) - Not validated | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| C4: Type of road: European | 0 | 0 | 0 | 0 | 0 | 0.2 | 0.4 | 0.7 | 0.8 | 0.9 | 0.9 | 0.9 | 0.9 | 0.9 | 0.9 |
| C4: Type of road: Motorway | 0 | 0 | 0 | 0 | 0 | 0.2 | 0.4 | 0.7 | 0.8 | 0.9 | 0.9 | 0.9 | 0.9 | 0.9 | 0.9 |
| C4: Type of road: national highway | 0 | 0 | 0 | 0 | 0 | 0.2 | 0.5 | 0.8 | 0.9 | 0.9 | 0.8 | 0.7 | 0 | 0 | 0 |
| C4: Type of road: Department highway | 0 | 0 | 0 | 0 | 0.2 | 0.4 | 0.8 | 0.9 | 0.9 | 0.9 | 0.5 | 0.3 | 0 | 0 | 0 |
| C4: Type of road: Local highway | 0 | 0.4 | 0.7 | 0.8 | 0.9 | 0.9 | 0.7 | 0.4 | 0 | 0 | 0 | 0 | 0 | 0 | 0 |
| C5: Driving situation: in town | 0.6 | 0.6 | 0.7 | 0.8 | 0.8 | 0.9 | 0.8 | 0.7 | 0 | 0 | 0 | 0 | 0 | 0 | 0 |
| C5: Driving situation: out of town | 0 | 0 | 0 | 0 | 0.4 | 0.5 | 0.6 | 0.7 | 0.9 | 0.9 | 0.9 | 0.8 | 0.8 | 0.8 | 0.8 |
| C5: Driving situation: intersection | 0.4 | 0.4 | 0.4 | 0.4 | 0.4 | 0.4 | 0.4 | 0.4 | 0.4 | 0 | 0 | 0 | 0 | 0 | 0 |
| C5: Driving situation: no intersection | 0.6 | 0.6 | 0.6 | 0.6 | 0.6 | 0.6 | 0.6 | 0.6 | 0.6 | 0.7 | 0.7 | 0.7 | 0.7 | 0.7 | 0.7 |
| C5: Driving situation: motorway exit | 0 | 0 | 0 | 0 | 0.5 | 0.8 | 0.8 | 0.9 | 0.8 | 0.7 | 0.5 | 0.5 | 0.2 | 0.2 | 0.2 |
| C5: Driving situation: no motorway exit | 0 | 0 | 0 | 0 | 0 | 0.1 | 0.2 | 0.7 | 0.8 | 0.9 | 0.9 | 0.9 | 0.8 | 0.8 | 0.8 |
| C6: Driving mode: validated | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| C6: Driving mode: not validated | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |

In the other examples of determining the first confidence index IC1, other parameters may be taken into consideration, in particular the accuracy of the digitization of the cartography, the date of the most recent update of the latter and the status of the road traffic etc.

The status of the road traffic (vehicle density along the road being driven and the fluidity) may be obtained for example from real-time traffic information. Real-time traffic information, still known as "RDS/TMC" ("Radio System Data/Traffic Message Channel"), enables the navigation system 101 to calculate itineraries while taking account of information received on a real-time basis by service operators, who send out information relating to the status of road traffic. This information is sent to the user by radio waves. The information relating to road traffic can also be transmitted by mobile telephony networks and thus received by a reception terminal linked to the navigation system 101. It is also possible to receive information through an access system to a global or worldwide information network (such as the Internet), either connected to or integrated into the navigation system 101.

Furthermore, the vehicle contains a second system 102, known as the image processing system, which is also able to estimate the speed limitation on a road being driven on, or about to be driven on, by the vehicle. The image processing system 102 activates a camera 121, which records images of the road at the point at which the vehicle is driving, and a set of image processing applications 122, the algorithms of which can in particular enable the speed limitation panels arranged along the roadside to be identified, in other words, they can be seen from the vehicle, and the figures indicated on these panels to be identified so that the current speed limit on the section of road in question to be calculated. The algorithms used can, for example, make use of recognition applications so as to recognize the round shapes of the speed limitation panels, in conjunction with color discrimination ability, so that only panels with a red contour would be identified and the character recognition algorithms would identify the figures depicted either individually or in their entirety. The image processing system 102 enables a second set of information 152 comprising at least one probable speed limitation at the point in question to be obtained. In certain embodiments of the present invention, the probable speed limitation is associated with a second confidence index IC2.

An example of the calculation of this second confidence index IC2 can, for a captured image, correspond to the following equation:

$$IC2=(\alpha_e\times C_e+\alpha_o\times C_o+\alpha_g\times C_g+\alpha_s\times C_s+\alpha_c\times C_c)/(\alpha_e+\alpha_o+\alpha_g+\alpha_s+\alpha_c),$$

in which the different intervening criteria as follows:

$C_e$: the entropy (measurement of the texture of the image in question)

$C_o$: the shadow factor on the image in question $C_g$: the vertical gradient of the light reduction on the image in question $C_s$: the index of symmetry of the image in question $C_c$: the index of consistency of the identification of the speed limitation panels from one image to the next one: the greater the number of consecutive images leading to the establishment of the same speed limitation, the higher will be the value of this index;

and in which $\alpha_e$, $\alpha_o$, $\alpha_g$, $\alpha_s$ et ac are the weighting coefficients assigned to the different Ci in relation to the confidence of the information and the relevance of the associated criterion.

The first and second sets of information 151 and 152 are thus processed by the way of fusion into a single data fusion system 154 to determine the searched speed limitation 153. To this end, information processing means are used, involving in particular a micro-processor and specific software applications, implemented in the data fusion system 154. The searched speed limitation 153 necessarily corresponds to a statutory speed limitation, that is to say a speed limitation that can be found along roads. The statutory speed limitations thus constitute a closed unit D, known as a discernment unit, which also represents all the speed limitations that could be obtained as a result at the output of one of these systems. This unit is defined for example as follows:

D={5,10,20,30,45,50,60,70,80,90,100,110,120,130,999}. The value 999 represents a situation in which there are no, or no more speed limitations A third confidence index IC3 is advantageously associated with the searched speed limitation 153. This enables a confidence level of information obtained from the data fusion system 154 to be presented. This is used freely in accordance with the embodiment examples: for example, if the third confidence index IC3 is lower than a threshold value, a limped home mode can be adopted in which no information relating to a current speed limitation is passed to a driver. In this way, the speed limitation results provided by the system in accordance with the invention are not utilized. In one embodiment, the third confidence index IC3 is equal to the average of the first confidence index IC1 and the second confidence index IC2.

In one particular embodiment of the invention, if at least one of the two confidence indexes is too low, for example, lower than a pre-determined threshold value, only the system that provides the better confidence index will be considered and the speed limitation provided by this system will be considered as the searched speed limitation level.

Figure 2:
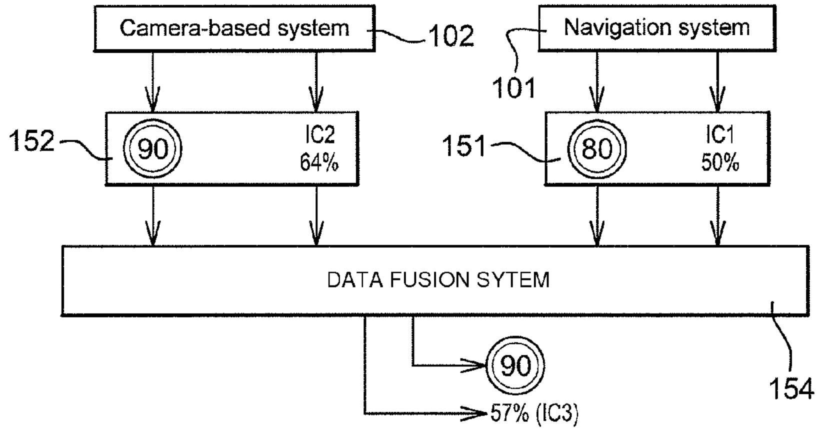
FIG. 2 is a schematic representation of a first embodiment of the process according to the invention.

A first embodiment of the process in accordance with the present invention is illustrated in detail in FIG. 2.

In this initial embodiment, the data fusion system 154 only generates the likely speed limitation, here 80 km/h, and the probable speed limitation, here 90 km/h, established respectively by the navigation system 101 and by the image processing system 102, associated with the respective confidence indexes, namely 50% for the first confidence index IC1 and 64% for the second confidence index IC2.

Different decision calculations are possible. On the one hand, it is possible to determine the speed limitation that is associated with the better confidence index directly as the searched speed limitation, or on the other, to choose a weighted average of the two speed limitations, namely the likely speed limitation and the probable speed limitation, with the weighting coefficients then representing the respective confidence indexes. In this way, an intermediary speed limitation value is obtained. The searched speed limitation is therefore the statutory limitation value that comes closest to the intermediary speed limitation, namely 90 km/h in the example shown.

Figure 3:
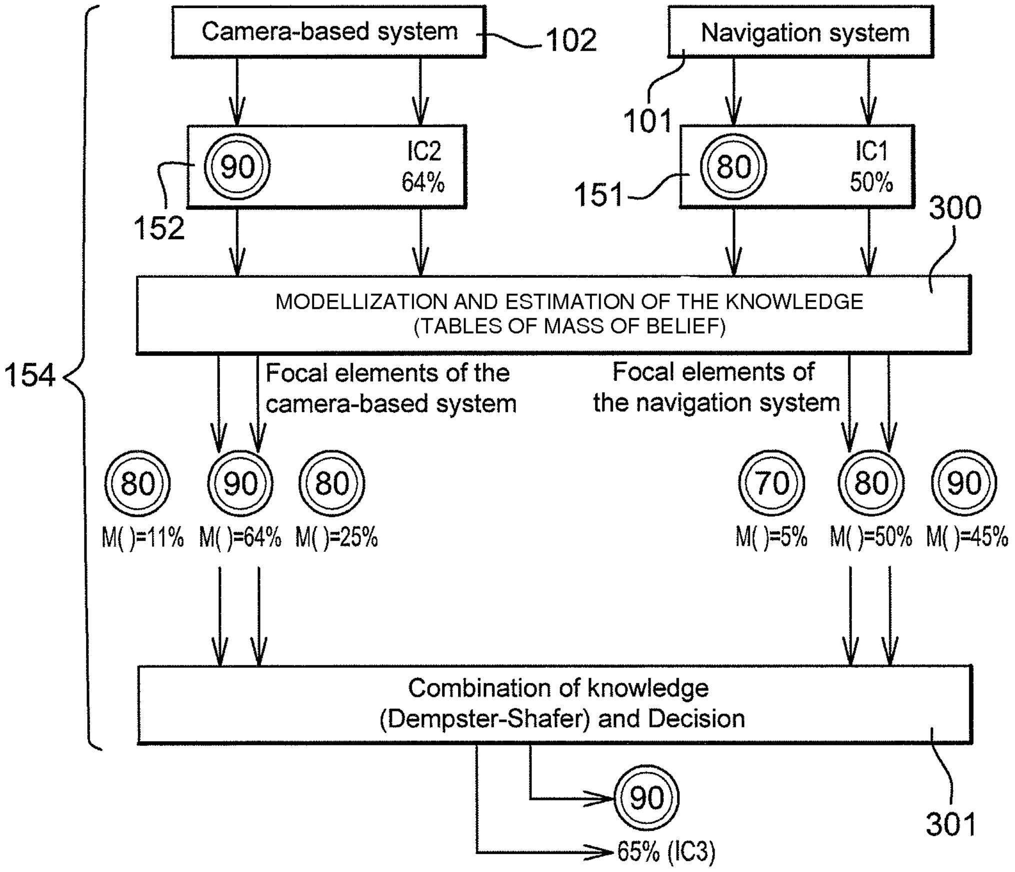
FIG. 3 is a schematic representation of a further embodiment of the process according to the invention.

In a second embodiment of the process according to the invention, illustrated in FIG. 3, an additional step 300 is added, in relation to the first embodiment, into the execution of the process.

For each of the two systems, the additional step 300 consists in enriching the first and second sets of information 151 and 152 with other additional speed limitations, namely the likely speed limitation and the probable speed limitation, with effect from the speed limitation that is obtained from each of the two systems installed.

In this way, for example, for the navigation system 101, the likely speed limitation initially determined is completed by the two statutory speed limitations immediately preceding and following the speed limit initially determined. In the example given, if the speed limitation of 80 km/h is determined as being likely, the first set of information 151 is completed by the speed limitations 70 km/h and 90 km/h. Other embodiments take into account the presence of particular features of the road being driven, considering for example the presence or the absence of a motorway exit (so as to prevent, for example, the process of determination from confusing the speed limitation from the deceleration lane as detected by the image processing system with that of the traffic lane in which the vehicle is travelling), the possible presence of intersections or particular geographical features (steep gradients etc.). Table 2 below contains an example showing by which additional likely speed limitations, also known as focal elements, the first set of information 151 is completed for each likely speed limitation determined by the navigation system 101.

TABLE 2

| Probable Speed Limitations | Number Of Additional Likely Speed Limitations | Additional Likely Speed Limitations (Focal Elements) |
|---|---|---|
| 5 | 2 | 10, 999 |
| 10 | 3 | 5, 20, 999 |
| 20 | 3 | 10, 30, 999 |
| 30 | 3 | 20, 45, 999 |
| 45 | 3 | 30, 50, 999 |
| 50 | 6 | 45, 60, 90, 110, 130, 999 |
| 60 | 3 | 50, 70, 999 |
| 70 | 3 | 60, 80, 999 |
| 80 | 3 | 70, 90, 999 |
| 90 | 4 | 50, 80, 100, 999 |
| 100 | 3 | 90, 110, 999 |
| 110 | 6 | 50, 90, 100, 120, 130, 999 |
| 120 | 3 | 110, 130, 999 |
| 130 | 5 | 50, 90, 110, 120, 999 |
| 999 | 0 | X |

In this way, an index, known as the mass of belief M, is attributed to each of the speed limitations present in the first set of information 151. This index corresponds for each of the speed limitations considered, to a probability that the speed limitation considered is the searched speed limitation. In this way, the greatest mass of belief is attributed to the likely speed limitation indicated by the navigation system 101, with the additional likely speed limitations adopting lesser masses of belief, determined in particular in relation to the features of the road made available by the navigation system 101 (for example, if the road is identified as being a motorway, the masses of belief of the focal elements will be much greater for the speed limitation high values). The sum of the masses of belief assigned for the first set of information 151 is therefore 100%.

Similarly, for the image processing system 102, the probable speed limitation initially determined is completed by statutory speed limitations, with which the shape recognition algorithms could have confused at least one of the figures shown on the panel. In the example shown, if the speed limitation of 90 km/h is determined as being probable, the second set of information 152 is completed by the speed limitations 60 km/h and 80 km/h, the risk of confusion between the 9 and the 6, on the one hand, and the 9 and 8 on the other, being significant. Other embodiments take into consideration the continuity over a number of successive images of information relating to the presence of a given speed limitation to determine the focal elements: if, between a number of images detecting the speed limitation of 90 km/h, one or more isolated images appear showing a different speed limitation, this different speed limitation will be part of the focal elements.

Once again, an index, known as a mass of belief M, is assigned to each of the speed limitations present in the second set of information 152. This index corresponds, for each speed limitation considered, to a probability that the speed limitation considered is the searched speed limitation. Therefore, the greatest mass of belief is assigned to the probable speed limitation given by the image processing system 102, with the additional probable speed limitations adopting the lesser masses of belief, determined notably in relation to a possible confusion index between the figures of the probable speed limitation that is established and other figures. This possible confusion index is specific to each recognition algorithm that is can to operate in the image processing system 102.

In a general manner, the determination of the confidence indexes, and/or the masses of belief, and their involvement in the fusion of knowledge produced by the two systems, depend on the fusion strategy that is used. Advantageously, in the invention, different methods taken from the so-called 'beliefs theory' can be used in the data fusion system 154. Notably, one of the methods, known as "conjunctive combination" by Dempster-Shafer, associated with a relationship known as the Dempster-Shafer equation, gives particularly convincing results. Other methods, based on Bayesian theories, or fuzzy logic theories can also be used in the data fusion system 154. These methods appear in a step 301 shown in FIG. 3.

Once the current speed limitation has been established, it can, for example, be displayed on a screen.

Other embodiments may also be considered, in which the current speed limit that has been established is compared to the speed of the vehicle. According to certain alternative embodiments, if the speed of the vehicle is greater than the established current speed limitation, the system will alert the driver, either by displaying a message on a screen, or by emitting an acoustic or a haptic signal (a vibrator under the seat, for example) or even by stiffening the operation of the accelerator pedal. According to one embodiment, the system can automatically reduce the speed of the vehicle (for example, by intervening at the level of the speed regulator), if the speed of the vehicle exceeds the current speed level calculated by the process in accordance with the present invention.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A process for the automatic determination of a current speed limitation on a road that is being used, or about to be used, by a motor vehicle, comprising the following steps:

establishing, by means of a first system, known as the navigation system, which involves notably a data receiver from a geographical positioning system together with cartographical data, a likely speed limitation associated with a first confidence index;

generating a first set of information comprising at least the likely speed limitation and the first confidence index;

establishing, by means of a second system, known as the image processing system, which involves notably the use of a camera and image processing applications capable of identifying and interpreting speed limitation panels arranged in the vicinity of the road, a probable speed limitation associated with a second confidence index;

generating a second set of information comprising at least the probable speed limitation and the second confidence index; and determining the current speed limitation on the road in question, on the basis of the first set of information and the second set of information and taking into consideration the first confidence index and the second confidence index;

wherein said first confidence index is calculated using a first plurality of criteria of information that is weighted in relation to a confidence of their associated information.

2. The process according to claim 1, wherein the first set of information is completed by a set of additional likely speed limitations.

3. The process according to claim 1, wherein the likely speed limitation and each additional likely speed limitation are associated with a weighting coefficient, known as a mass of belief, determined on the basis of at least one of the following parameters:

the first confidence index;

an index for the consistency between the likely speed limitation and the characteristics of the road provided by navigation system.

4. The process according to claim 2, wherein the additional likely speed limitations are the two statutory speed limitations immediately preceding and following the likely speed limitation.

5. The process according to claim 1, wherein the second set of information is completed by a set of additional probable speed limitations.

6. The process according to claim 1, wherein the probable speed limitation and each additional probable speed limitation are associated with a weighting coefficient, known as a mass of belief, determined on the basis of at least one of the following parameters:

the second confidence index;

an index of possible confusion between the figures constituting the established probable speed limitation and other figures.

7. A process for the automatic determination of a current speed limitation on a road that is being used, or about to be used, by a motor vehicle, comprising the following steps:

establishing, by means of a first system, known as the navigation system, which involves notably a data receiver from a geographical positioning system together with cartographical data, a likely speed limitation associated with a first confidence index;

constituting a first set of information comprising at least the likely speed limitation and the first confidence index;

establishing, by means of a second system, known as the image processing system, which involves notably the use of a camera and image processing applications capable of identifying and interpreting speed limitation panels arranged in the vicinity of the road, a probable speed limitation associated with a second confidence index;

constituting a second set of information comprising at least the probable speed limitation and the second confidence index; and determining the current speed limitation on the road in question, on the basis of the first set of information and the second set information and taking into consideration the first confidence index and the second confidence index;

wherein the set of additional probable speed limitations are statutory speed limitations for which an index for the possible confusion between the figures constituting the established probable speed limitation and the figures for the set of additional probable speed limitation is greater than a threshold value, known as the critical threshold value.

8. A process for the automatic determination of a current speed limitation on a road that is being used, or about to be used, by a motor vehicle, comprising the following steps:

establishing, by means of a first system, known as the navigation system, which involves notably a data receiver from a geographical positioning system together with cartographical data, a likely speed limitation associated with a first confidence index;

constituting a first set of information comprising at least the likely speed limitation and the first confidence index;

establishing, by means of a second system, known as the image processing system, which involves notably the use of a camera and image processing applications capable of identifying and interpreting speed limitation panels arranged in the vicinity of the road, a probable speed limitation associated with a second confidence index;

constituting a second set of information comprising at least the probable speed limitation and the second confidence index; and determining the current speed limitation on the road in question, on the basis of the first set of information and the second set of information and taking into consideration the first confidence index and the second confidence index;

wherein the determined current speed limitation is associated with a third confidence index, calculated at least on the basis of the first confidence index and the second confidence index.

9. The process according to claim 1, wherein said process comprises an additional step consisting in only using the determined current speed limitation if a third confidence index is greater than a third threshold value.

10. The process according to claim 1, wherein the first confidence index is calculated on the basis of one or more parameters from a first set of parameters made up of the following parameters:

accuracy of the geographical positioning system;

level of information on the road;

functional class of the road;

type of road;

surroundings of the vehicle;

selection of a driving mode by the driver and the level of conformity between a pre-determined itinerary and information provided by sensors fitted to the vehicle;

accuracy of the digitization of the cartography;

date on which the cartography was last updated.

11. The process according to claim 10, wherein the first confidence index is calculated by carrying out a weighted average of values assigned to the following parameters, the parameters being associated with weighting coefficients obtained from a learning phase:

accuracy of the geographical positioning system;

level of information on the road;

functional class of the road;

type of road;

surroundings of the vehicle;

selection of a driving mode by the driver and the level of conformity between a pre-determined itinerary and information provided by sensors fitted to the vehicle.

12. A process for the automatic determination of a current speed limitation on a road that is being used, or about to be used, by a motor vehicle, comprising the following steps:

establishing, by means of a first system, known as the navigation system, which involves notably a data receiver from a geographical positioning system together with cartographical data, a likely speed limitation associated with a first confidence index;

constituting a first set of information comprising at least the likely speed limitation and the first confidence index;

establishing, by means of a second system, known as the image processing system, which involves notably the use of a camera and image processing applications capable of identifying and interpreting speed limitation panels arranged in the vicinity of the road, a probable speed limitation associated with a second confidence index;

constituting a second set of information comprising at least the probable speed limitation and the second confidence index; and determining the current speed limitation on the road in question, on the basis of the first set of information and the second set of information and taking into consideration the first confidence index and the second confidence index;

wherein the second confidence index is calculated on the basis of one or more parameters, from a second set of parameters relating to one or more images obtained by the camera, from the following:

index of the consistency of the identification of speed limitation panels from one image to the next one;

measurement of the texture of the image in question, shadow factor of the image in question, vertical gradient of the reduction of the light, symmetry index of the image in question.

13. The process according to claim 12, wherein the second confidence index is calculated by carrying out a weighted average of the values assigned to all of the parameters of the second set of parameters, these parameters being associated with weighting coefficients resulting from a learning phase.

14. A process for the automatic determination of a current speed limitation on a road that is being used, or about to be used, by a motor vehicle, comprising the following steps:

establishing, by means of a first system, known as the navigation system, which involves notably a data receiver from a geographical positioning system together with cartographical data, a likely speed limitation associated with a first confidence index;

constituting a first set of information comprising at least the likely speed limitation and the first confidence index;

establishing, by means of a second system, known as the image processing system, which involves notably the use of a camera and image processing applications capable of identifying and interpreting speed limitation panels arranged in the vicinity of the road, a probable speed limitation associated with a second confidence index;

constituting a second set of information comprising at least the probable speed limitation and the second confidence index; and determining the current seed limitation on the road in question, on the basis of the first set of information and the second set of information and taking into consideration the first confidence index and the second confidence index;

wherein said process comprises additional steps, consisting in:

comparing the first confidence index with a first threshold value and the second confidence index with a second threshold value;

when determining the current speed limitation, considering only the set or sets of information, from the first set of information and the second set of information, the confidence index of which is greater than the threshold value to which it is compared.

15. A process for the automatic determination of a current speed limitation on a road that is being used, or about to be used, by a motor vehicle, comprising the following steps:

establishing, by means of a first system, known as the navigation system, which involves notably a data receiver from a geographical positioning system together with cartographical data, a likely speed limitation associated with a first confidence index;

constituting a first set of information comprising at least the likely speed limitation and the first confidence index;

establishing, by means of a second system, known as the image processing system, which involves notably the use of a camera and image processing applications capable of identifying and interpreting speed limitation panels arranged in the vicinity of the road, a probable speed limitation associated with a second confidence index;

constituting a second set of information comprising at least the probable speed limitation and the second confidence index; and determining the current speed limitation on the road in question on the basis of the first set of information and the second set of information and taking into consideration the first confidence index and the second confidence index;

wherein the step for the determination of the current speed limitation involves the use of a Dempster-Shafer equation.

16. A system for automatic determining a current speed limitation for a road being driven on, or about to be driven on, by a motor vehicle, wherein said system comprises:

a first system, known as the navigation system, involving notably a geographical positioning system and cartographical data in order to establish a likely speed limitation associated with a first confidence index and to constitute a first set of information comprising at least the likely speed limitation and the first confidence index;

a second system, known as the image processing system, involving notably the use of a camera and image processing applications, capable of identifying and interpreting speed limitation panels arranged in the vicinity of the road, in order to establish a probable speed limitation associated with a second confidence index and in order to constitute a second set of information comprising at least the probable speed limitation and the second confidence index;

means for associating said first confidence index to said first set of information and said second confidence index to said second set of information and for processing information in order to determine, from said first set of information and said second set of information, said current speed limitation in force on the road in question in response to an evaluation of both said first set of information and said first confidence index and said second set of information and said second confidence index.

17. The system according to claim 16, wherein said system comprises means for restitution of the determined current speed limitation.

18. A system for automatic determining a current speed limitation for a road being driven on, or about to be driven on, by a motor vehicle, said system comprising:

a geographical positioning system for establishing a likely speed limitation associated with a first confidence index;

a camera and image processing system, capable of identifying and interpreting speed limitation panels arranged in the vicinity of the road in order to establish a probable speed limitation associated with a second confidence index; and a data fusion system for receiving a first set of information and a second set of information and for associating said first confidence index to said first set of information and said second confidence index to said second set of information and for determining said current speed limitation in force on the road in question in response to an evaluation of both said first set of information and said first confidence index and said second set of information and said second confidence index.

19. The system according to claim 18, wherein said system comprises means for restitution of the determined current speed limitation.

20. The system according to claim 18, wherein said data fusion system displays said likely speed limitation if said first confidence index is greater than said second confidence index or displays said probable speed limitation if said second confidence index exceeds said first confidence index.

* * * * *